United States Patent
Beal

(10) Patent No.: US 9,321,316 B1
(45) Date of Patent: Apr. 26, 2016

(54) TRAILER HITCH STORAGE APPARATUS

(71) Applicant: Richard Beal, Justin, TX (US)

(72) Inventor: Richard Beal, Justin, TX (US)

( * ) Notice: Subject to any disclaimer, the term of this patent is extended or adjusted under 35 U.S.C. 154(b) by 0 days.

(21) Appl. No.: 14/885,792

(22) Filed: Oct. 16, 2015

(51) Int. Cl.
*B60D 1/52* (2006.01)
*B60R 9/06* (2006.01)
*B60D 1/173* (2006.01)
*B60R 11/00* (2006.01)
*B60D 1/54* (2006.01)

(52) U.S. Cl.
CPC ........ *B60D 1/52* (2013.01); *B60D 1/173* (2013.01); *B60D 1/54* (2013.01); *B60R 9/06* (2013.01); *B60R 2011/004* (2013.01)

(58) Field of Classification Search
CPC ............ B60D 1/481; B60D 1/54; B60D 1/58; B60R 9/00; B60R 9/045; B60R 9/048; B60R 9/052; B60R 9/06; B60R 9/08; B60R 2011/004; B62D 43/02; B62D 43/04
USPC ......... 224/402, 403, 404, 405, 511, 512, 518, 224/519, 520, 521; 280/416.1, 491.1, 280/491.5, 504, 507, 511
See application file for complete search history.

(56) References Cited

U.S. PATENT DOCUMENTS

| | | | | |
|---|---|---|---|---|
| 5,884,930 | A * | 3/1999 | Cluth ................. | B60D 1/07 224/519 |
| 6,089,431 | A * | 7/2000 | Heyworth ............ | B60D 1/075 224/521 |
| 6,502,845 | B1 * | 1/2003 | Van Vleet ........... | B60D 1/44 280/491.1 |
| 6,832,709 | B2 | 12/2004 | Henry | |
| 6,874,804 | B2 * | 4/2005 | Reese ................. | B60D 1/06 224/520 |
| 7,055,844 | B1 | 6/2006 | Bostedt | |
| 7,204,505 | B2 | 4/2007 | Moss | |
| 7,661,543 | B1 * | 2/2010 | Townsend ........... | B60D 1/52 211/4 |
| 7,815,211 | B2 * | 10/2010 | Witchey .............. | B60D 1/07 224/519 |
| 8,231,035 | B1 * | 7/2012 | Michael ............... | B60D 1/60 224/403 |
| 8,469,429 | B1 * | 6/2013 | Spronk ................ | B60R 11/00 296/37.1 |
| D688,168 | S * | 8/2013 | Buschman ........... | B60D 1/60 D12/162 |
| D697,838 | S * | 1/2014 | Borkholder ......... | B60D 1/60 D12/162 |
| 8,893,939 | B2 * | 11/2014 | Brass .................. | B60D 1/60 224/515 |
| 2004/0124607 | A1 * | 7/2004 | Norquay .............. | B60R 9/06 280/491.5 |
| 2004/0150189 | A1 * | 8/2004 | Deanda ................ | B60D 1/06 280/491.1 |
| 2004/0150205 | A1 * | 8/2004 | DeAnda ............... | B60R 9/06 280/769 |
| 2006/0220347 | A1 * | 10/2006 | Witchey .............. | B60D 1/06 280/507 |
| 2006/0289580 | A1 * | 12/2006 | Faver .................. | B60D 1/06 224/521 |

(Continued)

*Primary Examiner* — Joseph Rocca
*Assistant Examiner* — Marc A Scharich
(74) *Attorney, Agent, or Firm* — Crossley & Stevenson IP Law

(57) ABSTRACT

A trailer hitch storage apparatus including a rectangular base plate, a hollow rectangular male member having a first front end welded to the base plate, and a hollow rectangular female member having a second front end welded to the base plate. The male member is removably disposed within a trailer hitch receiver which receives an open first rear end of the male member. A ball mount is removably disposed within the female member through a second rear end. A right portion of a pin is slidably and continuously disposed through a first pair of openings disposed through the female member and a second pair of openings disposed through the ball mount. A left portion of a pin is slidably and continuously disposed through a first pair of apertures disposed through the male member and a second pair of apertures disposed through the trailer hitch receiver.

3 Claims, 3 Drawing Sheets

(56) References Cited

U.S. PATENT DOCUMENTS

| | | | |
|---|---|---|---|
| 2008/0264991 A1* | 10/2008 | Foster | B60R 9/06 224/519 |
| 2010/0294819 A1* | 11/2010 | Spera | B60R 9/06 224/519 |
| 2011/0156369 A1* | 6/2011 | Schroder | B60D 1/06 280/491.1 |
| 2012/0217724 A1* | 8/2012 | Works | B60D 1/06 280/490.1 |
| 2014/0054344 A1* | 2/2014 | Watkins | B62D 43/02 224/519 |
| 2015/0184795 A1* | 7/2015 | Babuska | B60D 1/07 248/314 |

* cited by examiner

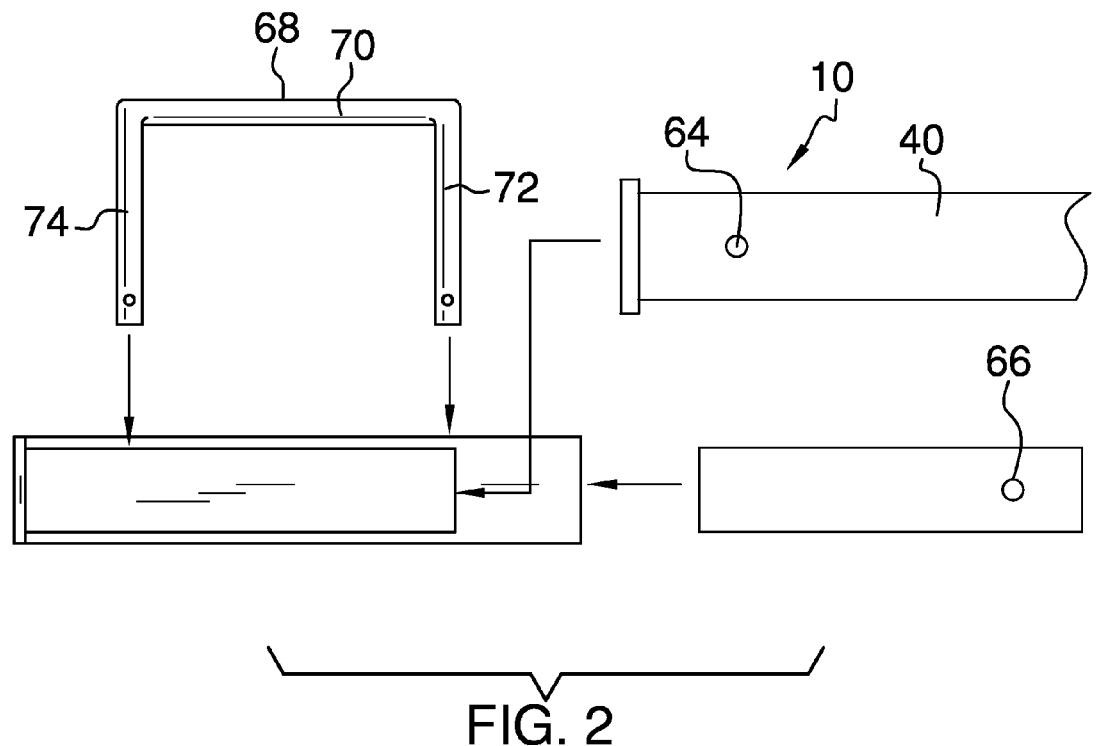
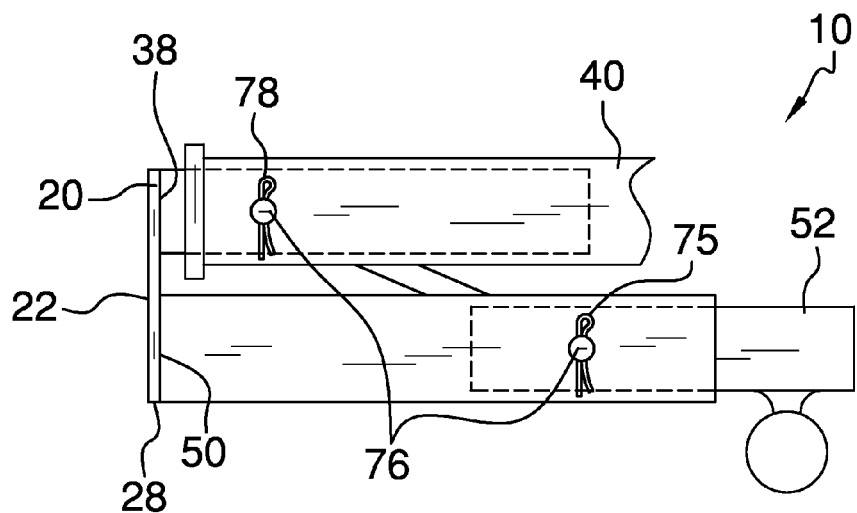

TRAILER HITCH STORAGE APPARATUS

BACKGROUND OF THE INVENTION

Various types of storage devices for a trailer hitch are known in the prior art. However, what has been needed is a trailer hitch storage apparatus including a rectangular base plate, a hollow rectangular male member having a first front end welded to the base plate, and a hollow rectangular female member having a second front end welded to the base plate. What has been further needed is for the male member to be removably disposed within a trailer hitch receiver through an open first rear end and for a ball mount to be removably disposed within the female member through a second rear end. As a result of the simultaneous attachment of the male member within the trailer hitch receiver and the ball mount within the female member, the ball mount can be safely transported and stored on a vehicle using the trailer hitch storage apparatus.

FIELD OF THE INVENTION

The present invention relates to storage devices for a trailer hitch, and more particularly, to a trailer hitch storage apparatus.

SUMMARY OF THE INVENTION

The general purpose of the present trailer hitch storage apparatus, described subsequently in greater detail, is to provide a trailer hitch storage apparatus which has many novel features that result in a trailer hitch storage apparatus which is not anticipated, rendered obvious, suggested, or even implied by prior art, either alone or in combination thereof.

To accomplish this, the present trailer hitch storage apparatus includes a rectangular base plate having a front surface, a rear surface, a top edge, and a bottom edge. A hollow rectangular male member has a first right side, a first left side, an open first rear end, and a first front end welded to the rear surface of the base plate adjacent to the top edge. A length of the male member substantially conforms to a length of the trailer receiver. The male member is configured to be removably disposed within a trailer hitch receiver through the first rear end. A hollow rectangular female member has a second right side, a second left side, an open second rear end, and a second front end welded to the rear surface of the base plate adjacent to the bottom edge. A ball mount is configured to removably disposed within the female member through the second rear end. A length of a gap between the male member and the female member is optionally one inch. A length of the female member is optionally three inches longer than a length of the male member.

A first of a first pair of apertures is disposed through the first left side of the male member proximal the first front end, and a second of the first pair of apertures is disposed through the first right side of the male member proximal the first front end. The first of the first pair of apertures is collinearly disposed with the second of the first pair of apertures. A first of a first pair of openings is disposed through the second left side of the female member proximal the second rear end, and a second of the first pair of openings is disposed through the second right side of the female member proximal the second rear end. The first of the first pair of openings is collinearly disposed with the second of the first pair of openings. The first pair of apertures is configured to be collinearly disposed with a second pair of apertures disposed through the trailer hitch receiver when the male member is disposed within the trailer hitch receiver. The first pair of openings is configured to be collinearly disposed with a second pair of openings disposed through the ball mount when the ball mount is disposed within the female member. A circumference of each of the first pair of apertures is equal to a circumference of each of the second pair of apertures. A circumference of each of the first pair of openings is equal to a circumference of each of the second pair of openings. A circumference of each of the first pair of apertures is equal to a circumference of each of the first pair of openings.

A linear U-shaped pin has a rear portion, a right portion perpendicularly disposed with the rear portion, and a left portion perpendicularly disposed with the rear portion. The right portion of the pin is configured to be slidably and continuously disposed through the first pair of openings and the second pair of openings when the ball mount is disposed within the female member. The left portion of the pin is configured to be slidably and continuously disposed through the first pair of apertures and the second pair of apertures when the male member is disposed within the trailer hitch receiver. A first of a pair of hitch pin clips is configured to be releasably securable around the right portion of the pin when the right portion of the pin is disposed through the first pair of openings and the second pair of openings. A second of the pair of hitch pin clips is configured to be releasably securable around the left portion of the pin when the left portion of the pin is disposed through the first pair of apertures and the second pair of apertures.

Thus has been broadly outlined the more important features of the present trailer hitch storage apparatus so that the detailed description thereof that follows may be better understood and in order that the present contribution to the art may be better appreciated.

BRIEF DESCRIPTION OF THE DRAWINGS

Figures

FIG. 2 is a top plan view.
FIG. 3 is a side elevation view.

DETAILED DESCRIPTION OF THE DRAWINGS

Figure 1:
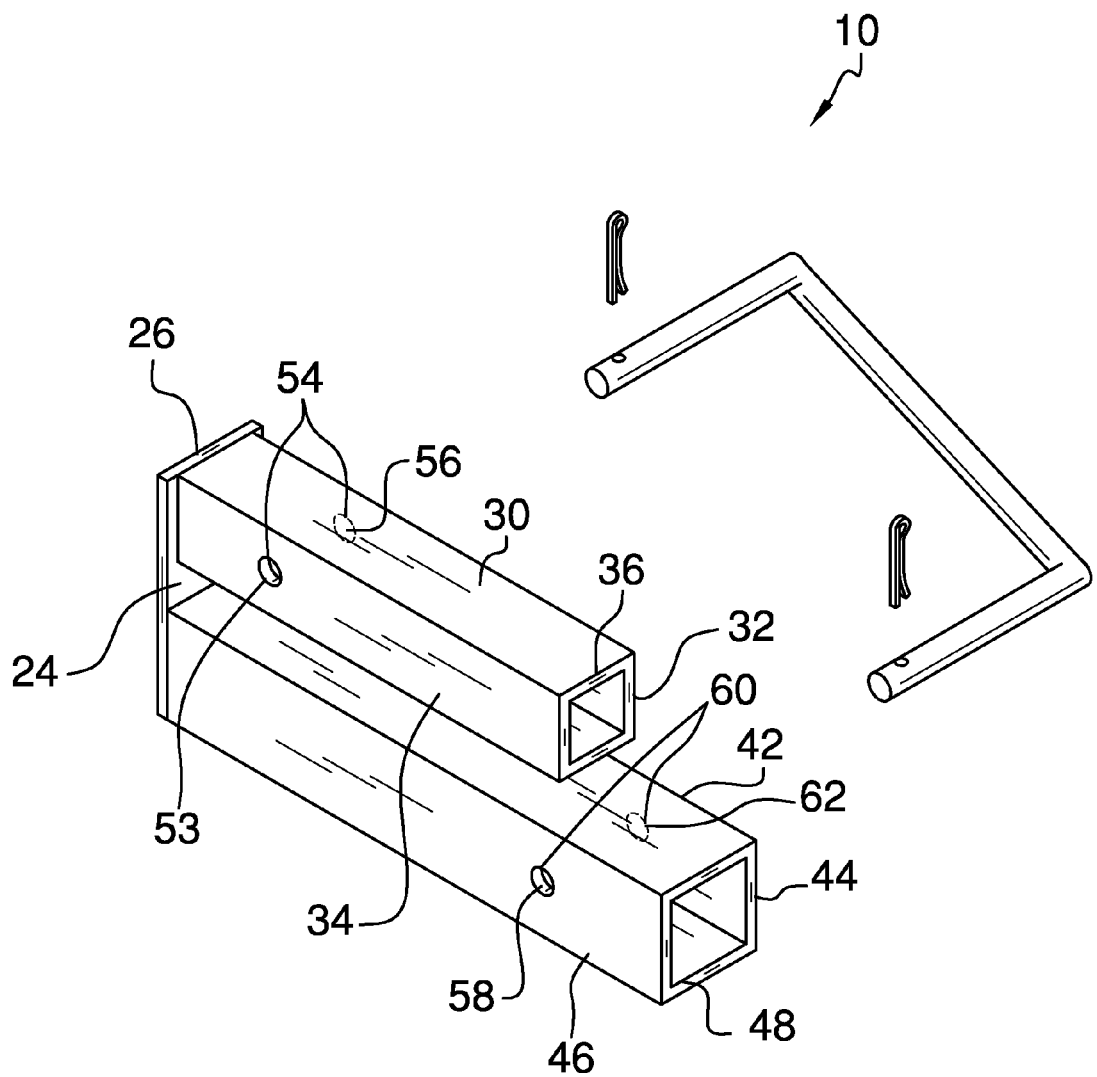
FIG. 1 is a front isometric view.
Figure 4:
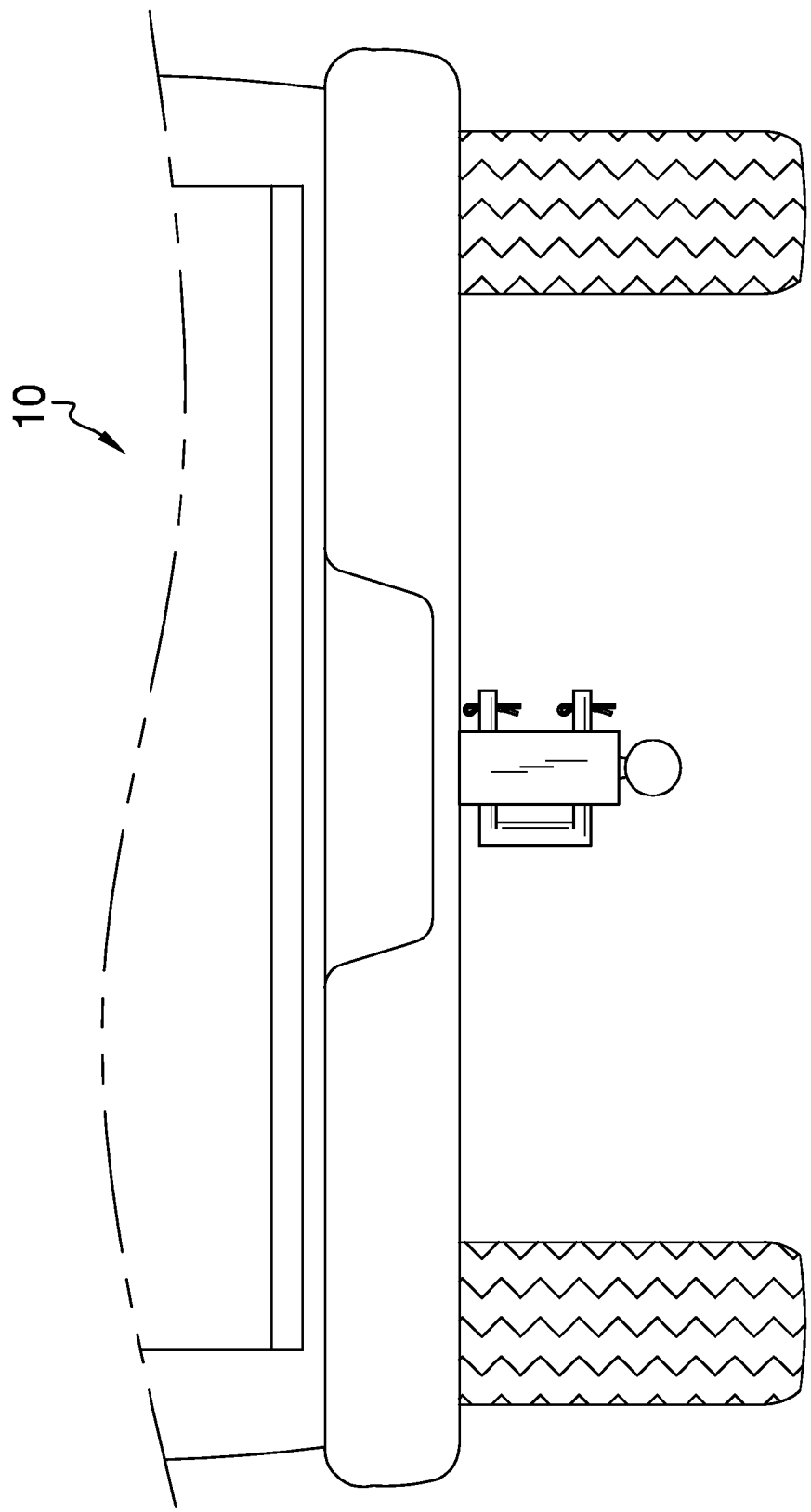
FIG. 4 is an in-use view.

With reference now to the drawings, and in particular FIGS. 1 through 4 thereof, an example of the instant trailer hitch storage apparatus employing the principles and concepts of the present trailer hitch storage apparatus and generally designated by the reference number 10 will be described.

Referring to FIGS. 1 through 4 the present trailer hitch storage apparatus 10 is illustrated. The trailer hitch storage apparatus 10 includes a rectangular base plate 20 having a front surface 22, a rear surface 24, a top edge 26, and a bottom edge 28. A hollow rectangular male member 30 has a first right side 32, a first left side 34, an open first rear end 36, and a first front end 38 welded to the rear surface 24 of the base plate 20 adjacent to the top edge 26. As best shown in FIG. 3, the male member 30 is configured to be removably disposed within a trailer hitch receiver 40 which receives the first rear end 36. A hollow rectangular female member 42 has a second right side 44, a second left side 46, an open second rear end 48, and a second front end 50 welded to the rear surface 24 of the base plate 20 adjacent to the bottom edge 28. As best shown in FIG. 3, a ball mount 52 is configured to be removably disposed within the female member 42 through the second rear end 48.

A first 53 of a first pair of apertures 54 is disposed through the first left side 34 of the male member 30 proximal the first front end 38, and a second 56 of the first pair of apertures 54 is disposed through the first right side 32 of the male member 30 proximal the first front end 38. The first 53 of the first pair of apertures 54 is collinearly disposed with the second 56 of the first pair of apertures 54. A first 58 of a first pair of openings 60 is disposed through the second left side 46 of the female member 42 proximal the second rear end 48, and a second 62 of the first pair of openings 60 is disposed through the second right side 44 of the female member 42 proximal the second rear end 48. The first 58 of the first pair of openings 60 is collinearly disposed with the second 62 of the first pair of openings 60. The first pair of apertures 54 is configured to be collinearly disposed with a second pair of apertures 64 disposed through the trailer hitch receiver 40 when the male member 30 is disposed within the trailer hitch receiver 40. The first pair of openings 60 is configured to be collinearly disposed with a second pair of openings 66 disposed through the ball mount 52 when the ball mount 52 is disposed within the female member 42.

A linear U-shaped pin 68 has a rear portion 70, a right portion 72 perpendicularly disposed with the rear portion 70, and a left portion 74 perpendicularly disposed with the rear portion 70. As best shown in FIG. 3, the right portion 72 of the pin 68 is configured to be slidably and continuously disposed through the first pair of openings 60 and the second pair of openings 66 when the ball mount 52 is disposed within the female member 42. The left portion 74 of the pin 68 is configured to be slidably and continuously disposed through the first pair of apertures 54 and the second pair of apertures 64 when the male member 30 is disposed within the trailer hitch receiver 40. A first 75 of a pair of hitch pin clips 76 is configured to be releasably securable around the right portion 72 of the pin 68 when the right portion 72 of the pin 68 is disposed through the first pair of openings 60 and the second pair of openings 66. A second 78 of the pair of hitch pin clips 76 is configured to be releasably securable around the left portion 74 of the pin 68 when the left portion 74 of the pin 68 is disposed through the first pair of apertures 54 and the second pair of apertures 64.

What is claimed is:

1. A trailer hitch storage apparatus comprising:
    a rectangular base plate having a front surface, a rear surface, a top edge, and a bottom edge;
    a hollow rectangular male member having a first right side, a first left side, an open first rear end, and a first front end welded to the rear surface of the base plate adjacent to the top edge;
    wherein the male member is configured to be removably disposed within a trailer hitch receiver which receives the first rear end;
    wherein a length of the male member substantially conforms to a length of the trailer hitch receiver;
    a hollow rectangular female member having a second right side, a second left side, an open second rear end, and a second front end welded to the rear surface of the base plate adjacent to the bottom edge;
    wherein a ball mount is configured to be removably disposed within the female member through the second rear end;
    a first pair of apertures, wherein a first aperture of the first pair of apertures is disposed through the first left side of the male member proximal the first front end, and a second aperture of the first pair of apertures is disposed through the first right side of the male member proximal the first front end, wherein the first aperture of the first pair of apertures is collinearly disposed with the second aperture of the first pair of apertures;
    a first pair of openings, wherein a first opening of the first pair of openings is disposed through the second left side of the female member proximal the second rear end, and a second opening of the first pair of openings is disposed through the second right side of the female member proximal the second rear end, wherein the first opening of the first pair of openings is collinearly disposed with the second opening of the first pair of openings;
    wherein the first pair of apertures are configured to be collinearly disposed with a second pair of apertures disposed through the trailer hitch receiver when the male member is disposed within the trailer hitch receiver;
    wherein the first pair of openings are configured to be collinearly disposed with a second pair of openings disposed through the ball mount when the ball mount is disposed within the female member;
    wherein a circumference of each of the first pair of apertures is equal to a circumference of each of the second pair of apertures;
    wherein a circumference of each of the first pair of openings is equal to a circumference of each of the second pair of openings;
    wherein the circumference of each of the first pair of apertures is equal to the circumference of each of the first pair of openings;
    a U-shaped pin having a linear rear portion, a linear right portion perpendicularly disposed relative to the rear portion, and a linear left portion perpendicularly disposed relative to the rear portion, wherein the right portion of the pin is configured to be slidably and continuously disposed through the first pair of openings and the second pair of openings when the ball mount is disposed within the female member, wherein the left portion of the pin is configured to be slidably and continuously disposed through the first pair of apertures and the second pair of apertures when the male member is disposed within the trailer hitch receiver; and
    a pair of hitch pin clips, wherein a first hitch pin clip of the pair of hitch pin clips is configured to be releasably securable around the right portion of the pin when the right portion of the pin is disposed through the first pair of openings and the second pair of openings, and wherein a second hitch pin clip of the pair of hitch pin clips is configured to be releasably securable around the left portion of the pin when the left portion is disposed through the first pair of apertures and the second pair of apertures.

2. The trailer hitch storage apparatus of claim 1 wherein a length of a gap between the male member and the female member is one inch.

3. The trailer hitch storage apparatus of claim 2 wherein a length of the female member is three inches longer than the length of the male member.

* * * * *